US010576450B2

(12) United States Patent
Fleming et al.

(10) Patent No.: US 10,576,450 B2
(45) Date of Patent: Mar. 3, 2020

(54) STRUCTURED PACKING WITH ENHANCED FLUID-FLOW INTERFACE (71) Applicant: GTC Technology US LLC, Houston, TX (US)

(72) Inventors: Phillip Bradley Fleming, Keller, TX (US); Casey F. Bowles, Coppell, TX (US); Michael J. Binkley, Glenn Heights, TX (US)

(73) Assignee: GTC Technology US LLC, Houston, TX (US)

( * ) Notice: Subject to any disclaimer, the term of this patent is extended or adjusted under 35 U.S.C. 154(b) by 0 days.

(21) Appl. No.: 15/928,375

(22) Filed: Mar. 22, 2018

(65) Prior Publication Data

US 2018/0207610 A1 Jul. 26, 2018

Related U.S. Application Data (63) Continuation of application No. 15/086,602, filed on Mar. 31, 2016, now Pat. No. 9,956,540.

(Continued)

(51) Int. Cl.
*B01J 19/32* (2006.01)
(52) U.S. Cl.
CPC ........ *B01J 19/32* (2013.01); *B01J 2219/3222* (2013.01); *B01J 2219/32213* (2013.01);
(Continued)
(58) Field of Classification Search
CPC .............. B01J 19/32; B01J 2219/32213; B01J 2219/3222; B01J 2219/32227;
(Continued)

(56) References Cited

U.S. PATENT DOCUMENTS

| 3,343,821 | A |   | 9/1967 | Winn et al. |
| 3,374,992 | A | * | 3/1968 | Greer ........................ B01J 19/32 |
|           |   |   |        | 261/112.2 |

(Continued)

FOREIGN PATENT DOCUMENTS

| EP | 0158917 A2 | 10/1985 |
| EP | 0733402 A1 | 9/1996 |

(Continued)

OTHER PUBLICATIONS

Yano, Akira, "A Recent Trend of the Distillation Apparatus and the Packing for the Distillation Column," Petrotech, vol. 13, No. 13, p. 55, Mar. 1990.

(Continued)

*Primary Examiner* — Charles S Bushey
(74) *Attorney, Agent, or Firm* — Winstead PC (57) ABSTRACT

A structured packing sheet includes a top interface region, a first turning region, a central region, a second turning region, and a bottom interface region. The central region includes a plurality of corrugations extending thereacross in a linear fashion and arranged generally parallel to each other. The plurality of corrugations are arranged at a first angle with respect to a vertical axis. The top interface region and the bottom interface region include the plurality of corrugations extending thereacross in a linear fashion. The plurality of corrugations are arranged at a second angle with respect to the vertical axis. The second angle is smaller than the first angle. The first turning region and the second turning region include the plurality of corrugations extending thereacross. The plurality of corrugations have a plurality of breaks in the first turning region and the second turning region.

4 Claims, 7 Drawing Sheets

Related U.S. Application Data (60) Provisional application No. 62/141,037, filed on Mar. 31, 2015.

(52) U.S. Cl.
CPC ............... *B01J 2219/32227* (2013.01); *B01J 2219/32244* (2013.01); *B01J 2219/32258* (2013.01); *B01J 2219/32272* (2013.01)

(58) Field of Classification Search
CPC .... B01J 2219/32244; B01J 2219/32258; B01J 2219/32272
USPC ........................................ 261/112.2, DIG. 72
See application file for complete search history.

(56) References Cited

U.S. PATENT DOCUMENTS

| | | | |
|---|---|---|---|
| 3,785,620 A | 1/1974 | Huber | |
| 3,959,419 A | 5/1976 | Kitterman | |
| 4,107,241 A | 8/1978 | Braun | |
| 4,128,684 A | 12/1978 | Bomio et al. | |
| 4,139,584 A | 2/1979 | Holmberg | |
| 4,256,673 A | 3/1981 | Braun | |
| 4,275,018 A | 6/1981 | Braun | |
| 4,337,217 A | 6/1982 | Braun | |
| 4,518,544 A | 5/1985 | Carter et al. | |
| 4,519,960 A | 5/1985 | Kitterman et al. | |
| 4,597,916 A | 7/1986 | Chen | |
| 4,603,022 A | 7/1986 | Yoneda et al. | |
| 4,604,247 A | 8/1986 | Chen et al. | |
| 4,643,853 A | 2/1987 | Braun | |
| 4,710,326 A | 12/1987 | Seah | |
| 4,729,857 A | 3/1988 | Lee et al. | |
| 4,732,713 A * | 3/1988 | Korsell | B01J 19/32 165/166 |
| 4,842,778 A | 6/1989 | Chen et al. | |
| 4,909,967 A | 3/1990 | Binkley et al. | |
| 5,124,087 A * | 6/1992 | Bradley | B01J 19/32 261/112.2 |
| 5,167,879 A | 12/1992 | Streng | |
| 5,185,106 A | 2/1993 | Chen et al. | |
| 5,262,095 A | 11/1993 | Bosquain et al. | |
| 5,632,933 A | 5/1997 | Yeoman et al. | |
| 5,762,834 A | 6/1998 | Hauser et al. | |
| 5,882,772 A | 3/1999 | Schultes | |
| 5,885,694 A | 3/1999 | Schultes | |
| 5,921,109 A | 7/1999 | Billingham et al. | |
| 6,206,349 B1 * | 3/2001 | Parten | B01J 19/32 261/112.2 |
| 6,293,526 B1 | 9/2001 | Fischer et al. | |
| 6,315,804 B1 | 11/2001 | Bradley | |
| 6,478,290 B1 * | 11/2002 | Ender | B01F 5/0643 261/112.2 |
| 6,588,736 B1 | 7/2003 | Chuang et al. | |
| 6,722,639 B2 | 4/2004 | Ender et al. | |
| 6,783,119 B2 | 8/2004 | Zich et al. | |
| 6,799,752 B2 | 10/2004 | Wu et al. | |
| 7,025,339 B2 | 4/2006 | Meski et al. | |
| 7,147,215 B2 | 12/2006 | Lehman et al. | |
| 7,210,324 B2 * | 5/2007 | Bender | B21D 19/00 72/379.6 |
| 7,267,329 B2 * | 9/2007 | Sunder | B01J 19/32 261/112.1 |
| 8,720,870 B2 | 5/2014 | Pilling et al. | |
| 9,295,925 B2 * | 3/2016 | Chen | B01J 19/32 |
| 9,517,501 B2 * | 12/2016 | Chin | B21D 13/02 |
| 9,956,540 B1 * | 5/2018 | Binkley | B01J 19/32 |
| 2003/0116871 A1 * | 6/2003 | Ringo | B01J 19/32 261/94 |
| 2003/0190461 A1 * | 10/2003 | McKeigue | B01J 19/32 428/185 |
| 2004/0261354 A1 * | 12/2004 | Gigola | B31F 1/20 52/745.19 |
| 2007/0295591 A1 | 12/2007 | Mosler | |
| 2008/0245651 A1 | 10/2008 | Werlen et al. | |
| 2012/0134886 A1 | 5/2012 | Schultes et al. | |

FOREIGN PATENT DOCUMENTS

| | | |
|---|---|---|
| EP | 0761303 A2 | 3/1997 |
| EP | 0764462 A2 | 3/1997 |

OTHER PUBLICATIONS

Schultes, M., Chambers, S., Reaching New Performance Levels with Surface Enhanced Raschig Super-Pak Structured Packings, American Institute of Chemical Engineers, Proceedings of the 2007 Spring Meeting & 3rd Global Conference on Process Safety.
Raschig Jaeger Technologies, A New Packing Structure with Innovative Advantages, Raschig Super-Pak Product Bulletin 501.

* cited by examiner

STRUCTURED PACKING WITH ENHANCED FLUID-FLOW INTERFACE

CROSS-REFERENCE TO RELATED APPLICATIONS

This application is a continuation of U.S. patent application Ser. No. 15/086,602, filed on Mar. 31, 2016, now U.S. Pat. No. 9,956,540. U.S. patent application Ser. No. 15/086,602 claims priority to U.S. Provisional Patent Application No. 62/141,037, filed Mar. 31, 2015. U.S. patent application Ser. No. 15/086,602 and U.S. Provisional Patent Application No. 62/141,037 are each incorporated herein by reference.

BACKGROUND

Field of the Invention

The present invention relates to vapor-liquid contact tower having a structured packing bed, the structured packing bed including a plurality of packing layers, the packing layers include a plurality of corrugated sheets and, more particularly, but not by way of limitation, corrugated contact sheets or plates having upper and lower linear corrugated fluid flow interface regions, each linear corrugated fluid flow interface region being disposed at an angle relative to intermediate corrugated body portions, at least some linear corrugated fluid flow interface regions abutting contiguous linear corrugated fluid flow interface regions of a second vertically-adjacent packing section to enhance fluid flow therebetween.

History of the Related Art

In the vapor-liquid tower contact art, it is highly desirable to efficiently improve the quality as well as the quantity of the mass heat transfer occurring in process towers during fluid flow therethrough. The technology of such process towers is replete with various material designs used for tower packing. Types of packing as well as packing designs are dependent on the particular process to be effected within the tower. The packing elements may thus comprise a structured grid array (grid packing) arranged to form a regular array inside the column or may comprise oblique shapes dumped into and randomly arranged (dump packing) or structured packing within the tower. Close fractionation and/or separation of the feed stock constituents introduced into the tower and the elimination of harmful or undesirable residual elements imparts criticality to the particular vapor-liquid contact apparatus placed within the tower. In particular, the shape of the grid, dump, or grid packing elements generally determines the flow patterns in and density of the array and the resultant resistance to fluid flow caused thereby.

It has been found particularly desirable to afford efficient heat transfer, fluid vaporization, or vapor condensation whereby cooling of one of the fluids can be accomplished with a minimum pressure drop through a given zone of minimum dimensions. High efficiency, low pressure drop, and reduced temperatures are most often found as design criteria in the chemical-engineering art as applied to petroleum fractionating operations. Process towers for effecting such chemical reactions are generally of the counter-current flow type providing descending fluid flow from an upper portion of the tower and ascending fluid flow from a lower portion of the tower. In some instances, the ascending fluid flow may be in the vapor phase. With ascending vapor flow, sufficient surficial area for vapor-liquid contact is necessary for the primary function and the reduction or elimination of liquid entrainment present in the ascending vapor. Most often it is necessary for the packing array to have sufficient mass and surficial area in both its horizontal and vertical planes so that fractions of the heavy constituents are conducted downwardly in condensed form and the vapors are permitted to rise through the packing with minimum impedance. With such an apparatus, undesirable solids or heavy constituents of the feed stock are removed by the coaction of the ascending liquid vapor to provide some self-cleaning with the grid. A plurality of stacked layers affording compatible and complemental design configurations are generally assembled within a single process column. Each layer utilizes the velocity and kinetic energy of the ascending vapors to perform the dual function of eliminating liquid entrainment in the ascending vapor and the thorough and turbulent contacting of the vapor with the descending liquid to accomplish sufficient separation or fractionation of the fluids into desired components. Quick cooling of the ascending vapor is generally a prerequisite for efficient operation to effect efficient heat transfer for vapor condensation and minimum pressure drop in a minimum vertical depth of the packing. Oppositely inclined corrugated lamella, also referred to as sheets or plates, have thus been utilized in the prior art for affording multiple vapor passages through the horizontal and vertical planes of the packing layers to insure the flow of vapor and distribution thereof within the lamella and prevent maldistribution, or channeling, of the vapor through certain portion of the layers and not others. Only in this manner is efficient and effective utilization of the column and the energies applied therein effected.

Most often used in process columns is a plurality of layers with packing members of each layer having angularly disposed adjacent elements. Each element generally has a structural configuration and angularity that permits a large upright vapor passage area which is in excess of one-half the horizontal area of the lamella. This design affords acceptable efficiency and vapor-liquid distribution for heat-mass transfer. Such structures also be necessity provide thorough and turbulent mixing or contacting of ascending vapor and descending liquid. This is done without materially displacing either the vapor or liquid from its vertical location within the flow grid. It is important to prevent maldistribution or channeling of either the vapor or the liquid through certain portions of the packing or its layers.

The structural configuration of inclined corrugated contact plates variety often incorporate linear vapor orifice passages. Vapor turbulence is created by such orifices to insure intimate vapor liquid contact. It is also necessary to insure the ascending vapor performs a dual function of liquid contact and liquid disentrainment within close proximity to the vertical location at which ascending vapor approaches or leaves the vapor passage orifices. In this manner maldistribution of ascending vapor or descending vapor is prevented.

Oppositely-inclined corrugated plates provide but one method and apparatus for countercurrent, liquid-vapor interaction. With such packing arrays, the liquid introduced at or near the top of the column and withdrawn at the bottom is effectively engaged by vapor being introduced at or near the bottom of the column and withdrawn at the top. In such methods and apparatus it is necessary to insure that the liquid and vapor achieve the desired degree of contact with each other so that the planned reaction or separation occurs at a designed rate within controlled parameters of mass transfer. The internal structure is, of course, passive in the sense that it is not power driven and has few, if any, moving parts. Common devices utilize cross-fluted and perforated sheets of material in face-to-face engagement. This configuration encourages the liquid moving through the packing to form itself into films having, in the aggregate, a large area over which the vapor may pass. However, the design problem is not merely a matter of providing a large surface area or a multitude of corrugations, cross-flutes, or perforations. A number of other interrelated design considerations must be taken into account, some of which have been mentioned above.

From a process standpoint, it is important that the desired vapor-liquid contact reaction be carried as close to completion as possible. For example, in a crude oil vacuum tower, close fractionation and good separation are needed to produce gas oil streams that are free of undesirable residual elements. As mentioned above, the contact column and its internal apparatus must efficiently utilize the heat supplied to the unit. In this manner, it minimizes direct operating costs, whether the reaction is mass transfer, heat transfer, liquid-vaporization or vapor condensing duty. With the above, pressure drop is the primary consideration as is the vapor-liquid fluid interface. U.S. Pat. No. 4,842,778, issued Jun. 27, 1989, for example, discusses a structured packing section having corrugated layers of one half to one third of conventional thickness for improving vapor-liquid interaction. U.S. Pat. No. 6,206,349, reexamination certificate issued Oct. 11, 2011, discusses packing sheets having a progressively varying crimp angle in the region of sheet interface. U.S. Pat. No. 5,124,087, issued Jun. 23, 1992, discusses packing sheets having a bottom edge that is cut on an oblique angle along the width of the packing sheet. U.S. Pat. No. 6,478,290, issued Nov. 12, 2002, discusses a packing section having a base region, a bulk region, and a top region. Each of the base region, the bulk region, and the top region has a particular geometry that is different from the other two regions.

In the above-referenced vapor-liquid contact method and apparatus patents, a plurality of design configurations are presented for affording intimate vapor-liquid contact. In particular, stacked corrugated contact plates in face-to-face contact having corrugations inclined to the horizontal, and/or orthogonal one to the other, have been shown and provided in various material configurations. These configurations include monofilament yarns, and solid plates.

While many prior art methods and apparatus for vapor liquid contact have been shown to be effective, certain disadvantages still remain. In particular, vapor-liquid contact towers incorporating descending liquid flow and ascending vapor flow of the structured packing variety defined above, is generally incapable of self-regulation of internal pressure differentials and the prevention of maldistribution, or non-homogenous, vapor-liquid flow across the grid areas. This is true even with a plurality of apertures disposed between corrugated and/or cross-fluted plates in face-to-fact contact. Vapor flow is ultimately sensitive to pressure differentials, including laminar flow patterns, and is easily diverted between the myriad of exposed areas of mating corrugations or flutes. When the corrugations of adjacent plates are inclined at relatively sharp angles, vapor flowing along any one corrugation may be substantially exposed to the adjacent corrugated channels rather than to the film of liquid along wall sections. Vapor-liquid flow in such configurations is thus susceptible to an inefficient, random flow pattern which cannot be accurately determined within the passive contact plates. Likewise, when corrugations of adjacent plates are inclined at relatively flat angles, vapor flowing along any one corrugation is susceptible to a high degree of pressure drop, which pressure drop inhibits fluid interaction and decreases efficiency.

Additionally, fluid flow through vertically-aligned structured packing sections is particularly important at an interface between two adjacent vertically-aligned structured packing sections. At the interface, fluid flow is susceptible to high pressure drop, random flow patterns, and decreased fluid interaction and efficiency. As will be discussed hereinbelow, the present invention facilitates decreased pressure drop at the interface by having corrugations interface at steep angles. However, by having the respective corrugations interface at angles between 15 degrees and 7 degrees from vertical, the present invention also facilitates laminar fluid flow along the corrugations thereby enhancing fluid interaction and improving efficiency.

SUMMARY

The present invention relates to vapor-liquid contact tower having a structured packing bed, the structured packing bed including a plurality of packing layers, the packing layers including a plurality of corrugated sheets and, more particularly, but not by way of limitation, corrugated contact sheets or plates having upper and lower linear corrugated fluid flow interface regions, the linear corrugated fluid flow interface regions being disposed at an angle relative to intermediate corrugated body portions, at least some linear corrugated fluid flow interface regions abutting contiguous linear corrugated fluid flow interface regions of a second vertically-adjacent packing section to enhance fluid flow therebetween. In a first aspect, the present invention relates to a structured packing system having a plurality of packing layers. The packing layers include a plurality of vertically oriented packing sheets. The vertically oriented packing sheets include a central region having linear corrugations disposed thereacross. A top interface region includes a first linear extension of the linear corrugations extending thereacross. A first turning region includes a first break and a second break in the linear corrugations extending thereacross. A second turning region includes a third break and a fourth break in the of the linear corrugations extending thereacross. A bottom interface region includes a second linear extension of the linear corrugations extending thereacross. The central region includes the plurality of corrugations extending thereacross in a linear fashion and arranged generally parallel to each other. The plurality of corrugations are arranged at a first angle with respect to a vertical axis. The top interface region and the bottom interface region comprise the first linear extension and the second linear extension, the first linear extension and the second linear extension are arranged at a second angle with respect to the vertical axis. The second angle is smaller than the first angle. The first break and the second break in the first turning region connects the linear corrugations of the central region with the first linear extension of the top interface region. The third break and the fourth break in the second turning region connects the linear corrugations of the central region with the second linear extension of the bottom interface region.

In another aspect, the present invention relates to a process column of the type facilitating enhanced interaction of a first fluid and a second fluid passing in counter-current flow therethrough and being constructed of a vessel having a first fluid inlet and a first fluid outlet disposed in a upper region thereof and a second fluid inlet and a second fluid outlet disposed in a lower region thereof for facilitating the counter-current flow of the first fluid and the second fluid therethrough. The process column includes a structured packing system having a plurality of packing layers, the packing layers include a plurality of vertically oriented packing sheets, the vertically oriented packing sheets include a central region having linear corrugations disposed thereacross. A top interface region has a first linear extension of the linear corrugations extending thereacross. A first turning region has at least one of a first plurality of breaks and a first curvilinear extension of the linear corrugations extending thereacross. A second turning region has at least one of a second plurality of corrugations and a second curvilinear extension of the linear corrugations extending thereacross. A bottom interface region has a second linear extension of the linear corrugations extending thereacross. The central region includes the plurality of corrugations extending thereacross in a linear fashion and arranged generally parallel to each other. The plurality of corrugations are arranged at a first angle with respect to a vertical axis. The top interface region and the bottom interface region include the first linear extension and the second linear extension. The first linear extension and the second linear extension are arranged at a second angle with respect to the vertical axis. The second angle is smaller than the first angle. The first curvilinear extension in the first turning region connects the linear corrugations of the central region with the first linear extension of the top interface region. The second curvilinear extension in the second turning region connects the linear corrugations of the central region with the second linear extension of the bottom interface region.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Various embodiments of the present invention will now be described more fully with reference to the accompanying drawings. The invention may, however, be embodied in many different forms and should not be construed as limited to the embodiments set forth herein.

Figure 1:
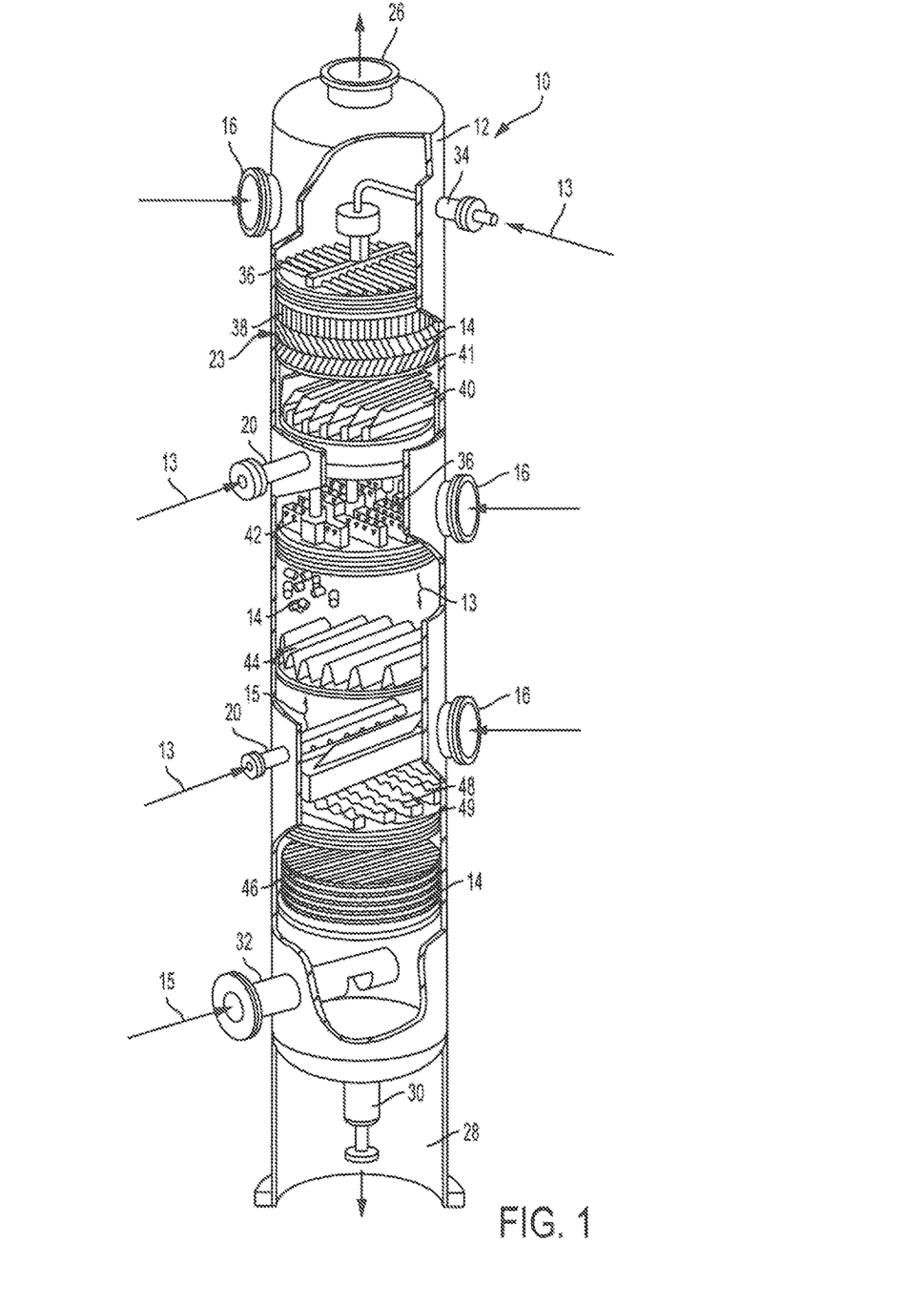
FIG. 1 is a perspective view of a packed column with various sections cut away for illustrating a variety of internal including a plurality of packing sections according to an exemplary embodiment.

Referring first to FIG. 1, there is shown a perspective view of a packed exchange column with various sections cut away for illustrating a variety of internals. The exchange column 10 includes a cylindrical tower 12 having a plurality of packing bed layers 14 disposed therein. A plurality of manways 16 are likewise constructed for facilitating access to the internal region of the tower 12 for placement of the packing bed layers 14. In a typical embodiment, vapor 15 is fed to the tower 12 through a vapor-inlet conduit 32 while liquid 13 is fed through feedlines 20, therein facilitating counter-current vapor-liquid flow through the packing bed layers 14.

Still referring to FIG. 1, the exchange column 10 includes a vapor outlet 26 disposed proximate a top of the tower 12. A lower skirt 28 is disposed about a lower region of the tower 12. The lower skirt 28 encloses a circulation pipe 30, which circulation pipe 30 may be coupled to a reboiler (not shown). A mixed feed or vapor-inlet conduit 32 is shown disposed above the lower skirt 28 for introducing vapor 15 therein upwardly through the packing bed layers 14. Reflux from condensers is provided in the upper tower region 23 through entry conduit 34 wherein liquid 13 is distributed throughout a liquid distributor 36 across an upper packing bed 38. It may be seen that the upper packing bed 38 is of the structured packing variety wherein a distributor packing (described below) is disposed for liquid distribution. The regions of the exchange column 10 beneath the upper packing bed 38 are shown for purpose of illustration and include a liquid collector 40 disposed beneath a support grid 41 in support of the upper structured packing bed 38. A liquid redistributor 42 is likewise disposed therebeneath and an intermediate support plate 44 is provided in an alternative configuration of the type adapted for supporting random packing of the ring or saddle variety, as representatively shown. A lower structured grid 46 is illustrated disposed beneath an alternative form of liquid distributor 48 comprising a plurality of troughs 49 adapted for dispersing the liquid thereacross in counter-current flow to the ascending vapor therebeneath.

Still referring to FIG. 1, the exchange column 10 is shown to include both random packing of varying packing bed height as well as structured packing. The structured packing sections are generally provided in established heights, such as 200 millimeters to 300 millimeters. This is generally due to mechanical and/or manufacturing considerations and may vary.

It may thus be seen from this figure that the counter-current configuration between the ascending vapor and the descending liquid is the subject of a plurality of critical design considerations including size/dimension ratios, liquid/vapor ratios, liquid cooling, foaming and the presence of solids or slurries therein. Corrosion is likewise a consideration of the various elements in the packed towers and the selection of the material in the fabrication of the tower internals is in many instances the results thereof.

Figure 2:
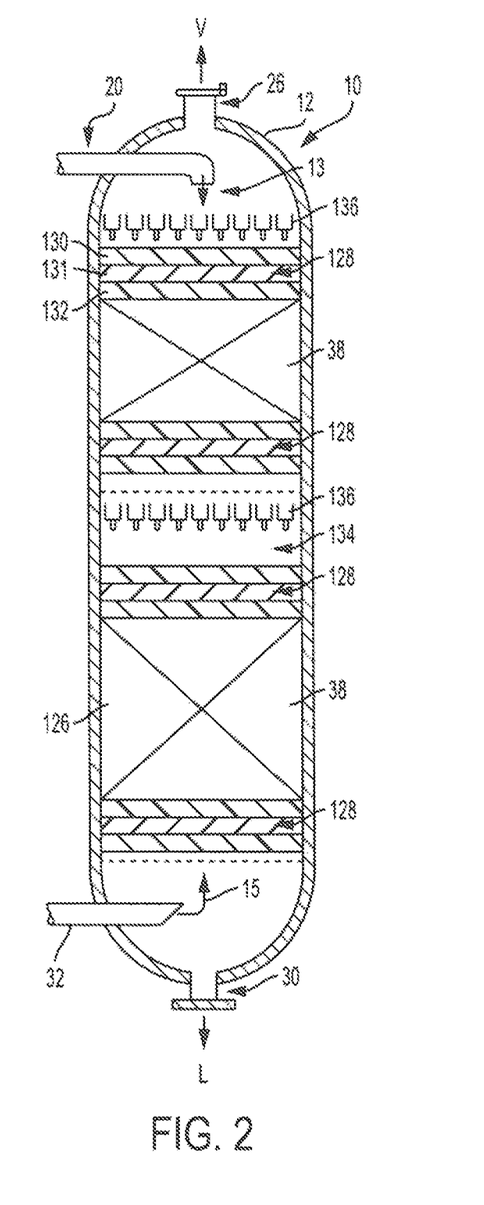
FIG. 2 is an enlarged side-elevational view of the process column of FIG. 1 illustrating the plurality of packing sections according to an exemplary embodiment.

FIG. 2 illustrates a diagrammatic, side-elevational, cross-sectional view of the exchange column 10 which is not drawn to scale. The tower 12, or containment vessel, is adapted for the flow of liquid 13 downwardly from feedlines 20 secured in the upper end of said vessel. At the lower end of the tower 12, vapor 15 is discharged from a vapor-inlet conduit 32 for the counter-current flow, interaction mixing with mass and heat transfer between the vapor and liquid. The interaction and mass/heat transfer occurs within the regions of the exchange column 10 where the upper and lower packing beds 38 is disposed. The upper and lower packing beds 38 as illustrated in FIG. 2 may be of any of a variety of types including dumped packing, structured high efficiency packing, or reactor catalyst bed.

Still referring to FIG. 2, distribution of the liquid 13 and the vapor 15 within the tower 12 is effected by structured upper packing beds 128 and lower packing bed 129 secured at select vertical positions therein. Packing sections 128 of the present invention comprise two or more elevation sections of corrugated and perforated sheets, normally with embossed patterns, disposed in an angular-rotated relationship one to the other. In a typical embodiment, several corrugated layers such as 130, 131, and 132 are disposed one atop the other to comprise each structured packing bed 128. The layers are angularly rotated relative to the others for purposes of maximizing lateral distribution of vapor or liquid passing therethrough. The placement of packing sections 128 is also shown in FIG. 1, above and below various packing bed layers 14 of the combination packing beds (128, 38). In this manner, structured packing beds 128 are disposed immediately beneath selectively designed distributors of several varieties for distributing the liquid 13 uniformly across the combination packing beds (128, 38) disposed in the tower 12. Likewise, a structured packing beds 128 is disposed beneath random packing bed 38 for evenly distributing upwardly rising vapor thereto for homogeneous interaction within said random packing.

Still referring to FIG. 2, the intermediate region 134 of the tower 12 may include a vapor/liquid distribution assembly 136 of special design of the type generally utilized for the exchange column 10. The utilization of the structured packing beds 128 of the present invention further facilitates reduction in the necessary vertical height in the tower 12. The intermediate vapor/liquid distribution assembly 136, combined with structured packing bed 128, result in improved efficiency and product purity.

Figure 3:
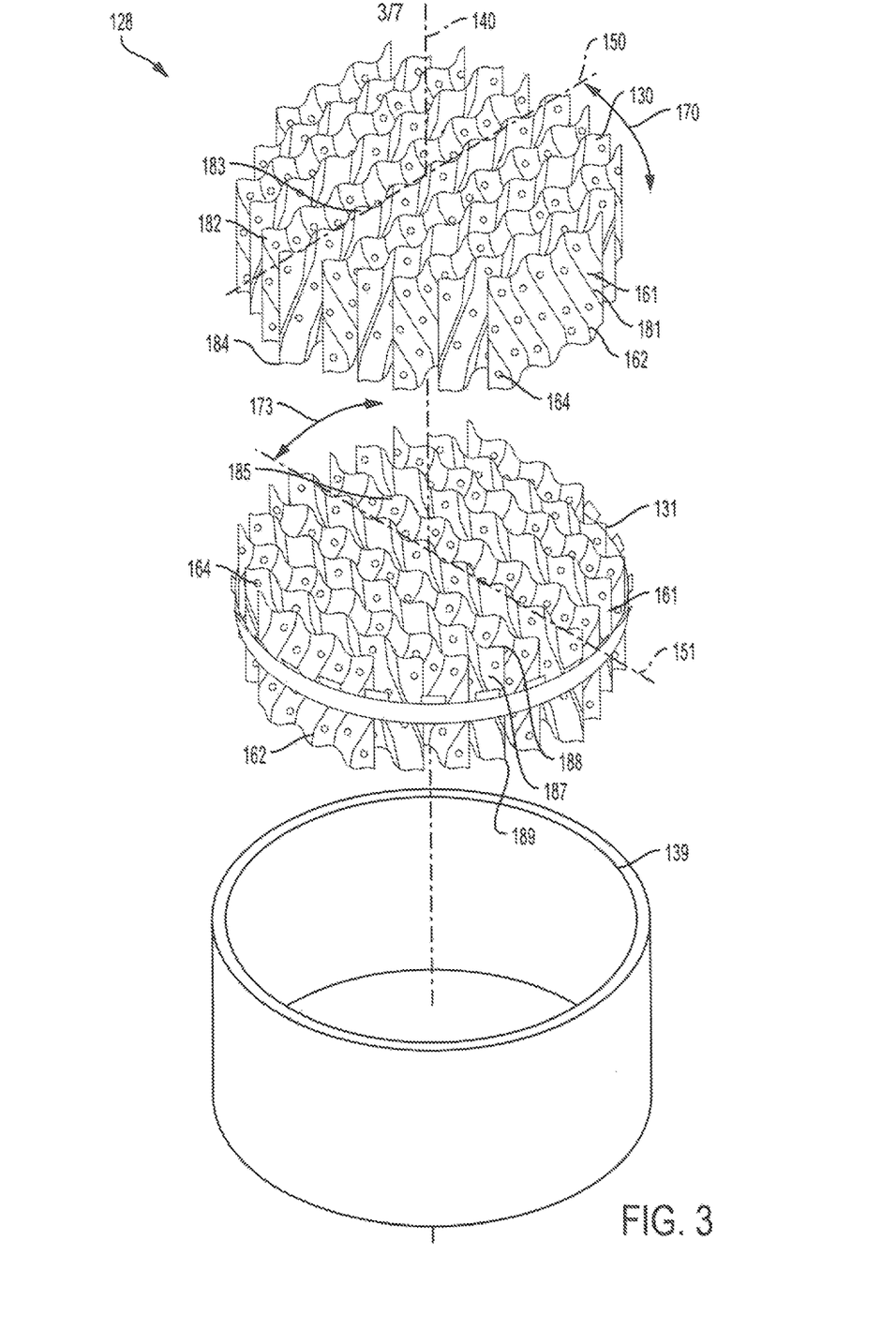
FIG. 3 is an exploded, perspective view of packing sections of FIG. 1 according to an exemplary embodiment.

It may further be seen that as liquid 13 is redistributed in region 134 it is then passed through a structured packing bed 128 disposed atop a lower random packing section 126 which itself is secured atop an underlying structured packing bed 128 disposed above the vapor-inlet conduit 32. In this manner vapor 15 ascending in the tower 12 is initially distributed through a vapor distributor tray beneath structured packing, then passing into a homogenous mixture with the descending liquid 13 in lower packing region (128, 38). As stated above, the utilization of high efficiency packing necessitates even vapor/liquid distribution for effective utilization therein Referring now to FIG. 3 there is shown an enlarged perspective view of a small column diameter packing section 128 of the present invention. The two layers 130 and 131 are thus shown in enlarged, exploded detail to comprise sheets 161 with corrugations 162 and perforations 164. The adjacent corrugated sheets 161 are alternatingly inverted such that the corrugations are crossing at the normal 45 degrees angularly oriented one to the other. As further shown herein each layer 130 and 131 is concentrically aligned about a longitudinal axis 140 during the stacking process and is rotated about the longitudinal axis 140 relative to the adjacent packing layer. For example, upper layer 130 is constructed with a notional sheet axis 150 parallel to the various corrugated sheets 161 which is rotated at an angle 170 relative to an underlying notional sheet axis 151 of packing section 131. By way of example, FIG. 3 depicts two layers 130 and 131; however one skilled in the art will recognize that, in other embodiments, three or more packing layers could be utilized. In this manner vapor or liquid passing through the various layers 130 and 131 of the packing section 128 is bi-directionally redirected for maximum efficiency and distribution and homogenous mixture therethrough.

Still referring to FIG. 3, the assembly of the packing section 128 preferably incorporates the utilization of a flexible, thin gauge metal band, as a wall wiper band 139 secured around the packing layers 130 and 131. The wall wiper band serves as a seal within the small spacing between the packing unit and the tower wall. This assembly also facilitates the sealing and installation of the packing section 128 within the tower 12. Moreover, the utilization of band 139 forms a discrete unit in small diameter columns which may be easily handled and arranged therein. The packing sections 130 and 131 are thus packaged in an assembly capable of select positioning throughout an exchange tower. In the exchange column 10, the structured packing is assembled as rectangular bricks sectioned to pass through tower manholes for installation. Still referring to FIG. 3, the corrugations 162 exhibit top and bottom interface regions are disposed at an angle of approximately 7 degree to approximately 15 degrees from vertical. As will be discussed hereinbelow with respect to FIGS. 5A-5B, the top and bottom regions reduce the pressure drop across the interface between the packing section 130 and the packing section 131 thereby improving fluid interaction and increasing efficiency. Further, since the interface corrugations of the packing section 130 and the packing section 131 are disposed at an angle of approximately 5 degrees to approximately 15 degrees from vertical, vapor-liquid flow in the corrugations maintains laminar flow along the corrugation and is not susceptible to such inefficient, random flow pattern as would be present if the interface corrugations 162 were oriented vertically.

Referring now to FIGS. 2-3 in combination, the construction and relative size of the multiple packing layers such as 130 and 131 as well as the corrugations formed therein is a function of the size of the containment vessel and other operational parameters. Each packing layer 130 and 131 is preferably formed of a height to corrugation length ratio affording fractional lateral dispersion into the contiguous rotated layer and bi-directional, substantially equalizing flow distribution therethrough. The upper packing layer 130 is comprised of corrugations 181. In this manner flow therealong is angularly disposed from a first lateral position 183 a relatively short lateral span to position 184 formed along the bottom edge of the upper packing layer 130. At a point 184, descending fluid flow then engages a corrugation channel 185 formed in upper packing section 131 which redirects said descending fluid flow in a second direction which is lateral to the notional sheet axis 150 of upper packing layers 130. In this manner, bi-directional fluid flow is established and only fractional lateral dispersion is provided into the contiguous rotated layers within the packing section 128 to facilitate bi-directional, substantially equalizing flow distribution therethrough. Likewise a corrugation channel 187 beginning at upper corrugation point 188 and terminating in lower corrugation channel point 189 of packing section 131 will abut and engage upper end of sequential corrugation channel which terminate at lower points thereebeneath. This redirection of descending fluid flow is likewise re-directional and further shifts the fluid flow a fractional lateral distance across the packing section 128. The multiplicity of corrugations in the layers 130 and 131 then provide a relatively large number of lateral dispersion channels which extend a fractional distance relative to the width of the corrugation layers 130 and 131.

Such fractional lateral dispersion permits enhanced flow redistribution and equalization as compared to a conventional corrugated packing element whose corrugation channel length approximates and/or is on the same order of magnitude as the width thereof. In such configurations the flow is often channeled to the side wall of the packing section resulting in fluid accumulations which accumulations are mitigated by the wall wiper band 139. The layer width to corrugation length ratio affords the fractional lateral dispersion which is critically important in high efficiency packing systems for proper process tower operation. Likewise the angle of rotation between the layers and the placement of apertures therethrough further affords control as to the type of lateral flow distribution bi-directionality and flow equalization provided therein. It may be seen that two layers 130 and 131 rotated relative one to the other provide the aforesaid flow characteristics although a series of multiple layers has been shown to be most effective in high efficiency packing configurations. By providing the corrugations of the initial layers of a size equal to or greater than the size of the corrugations of the main bed packing 38, pressure drop is minimized and the efficiency of mass transfer can be improved.

Figure 4A:
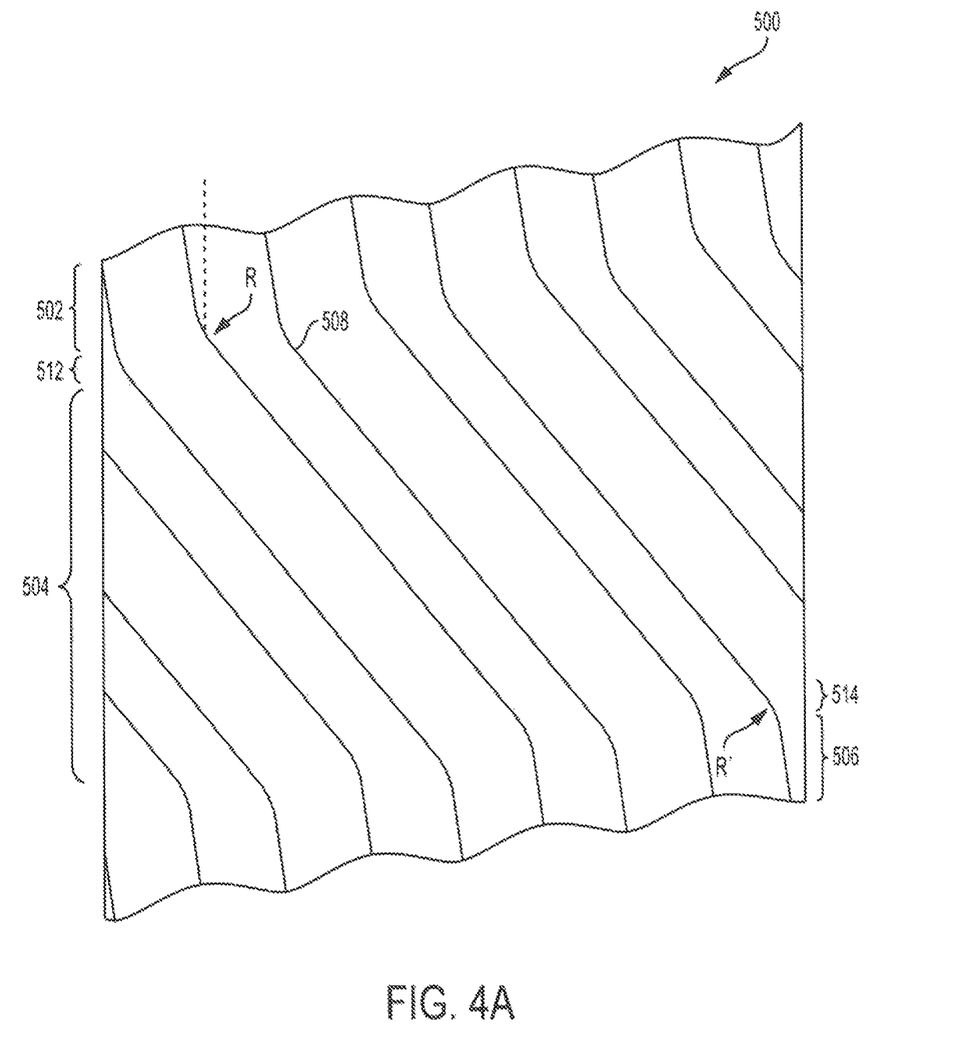
FIG. 4A is a perspective view of a single packing sheet according to an exemplary embodiment.

FIG. 4A is a perspective view of a single packing sheet 500. The packing sheet 500 includes a top interface region 502, a central region 504, and a lower interface region 506. In a typical embodiment, a height of the top interface region 502 and a height of the lower interface region 506 each account for approximately 5% to approximately 25% of a height of the packing sheet 500; however in other embodiments, other height ratios could be employed. Each of the top interface region 502, the central region 504, and the lower interface region 506 contain a plurality of corrugations 508. For purposes of illustration, FIG. 4A shows a single crimp 508; however, it will be understood that packing sheets according to principles of the present invention will include a plurality of corrugations 508 arranged in a generally parallel orientation with respect to each other. The corrugations 508 extend across the central region 504 at an angle of approximately 45 degrees from vertical; however, in other embodiments the corrugations 508 may be oriented at an angle in the range of approximately 30 degrees to approximately 70 degrees from vertical.

Still referring to FIG. 4A, a first turning region 512, is disposed between the central region 504 and the top interface region 502. A second turning region 514 is disposed between the central region 504 and the lower interface region 506. In the first turning region 512 and the second turning region 514, the corrugations 508 turn to be oriented at an angle of approximately 5 degrees to approximately 15 degrees from vertical. In a typical embodiment, the corrugations 508 are oriented at an angle in the range of approximately 5 degrees to approximately 7 degrees from vertical. A turn radius (R) of the corrugations 508 in the first turning region 512 may be any appropriate radius but is preferably in the range of 3 millimeters to 12 millimeters or about half of the crimp height. A turn radius (R') of the corrugations 508 in the second turning region 514 is typically equal to the turn radius (R); however, in other embodiments, the turn radius (R') may be unequal to the turn radius (R). Still referring to FIG. 4A, upon entering the top interface region 502 and the lower interface region 506, the corrugations assume a straight, generally parallel orientation arranged at an angle of approximately 5 degrees to approximately 15 degrees from vertical. In a typical embodiment, a lower border 518 of the lower interface region 506, abuts an upper border of an adjacent packing sheet (not explicitly shown).

Figure 4B:
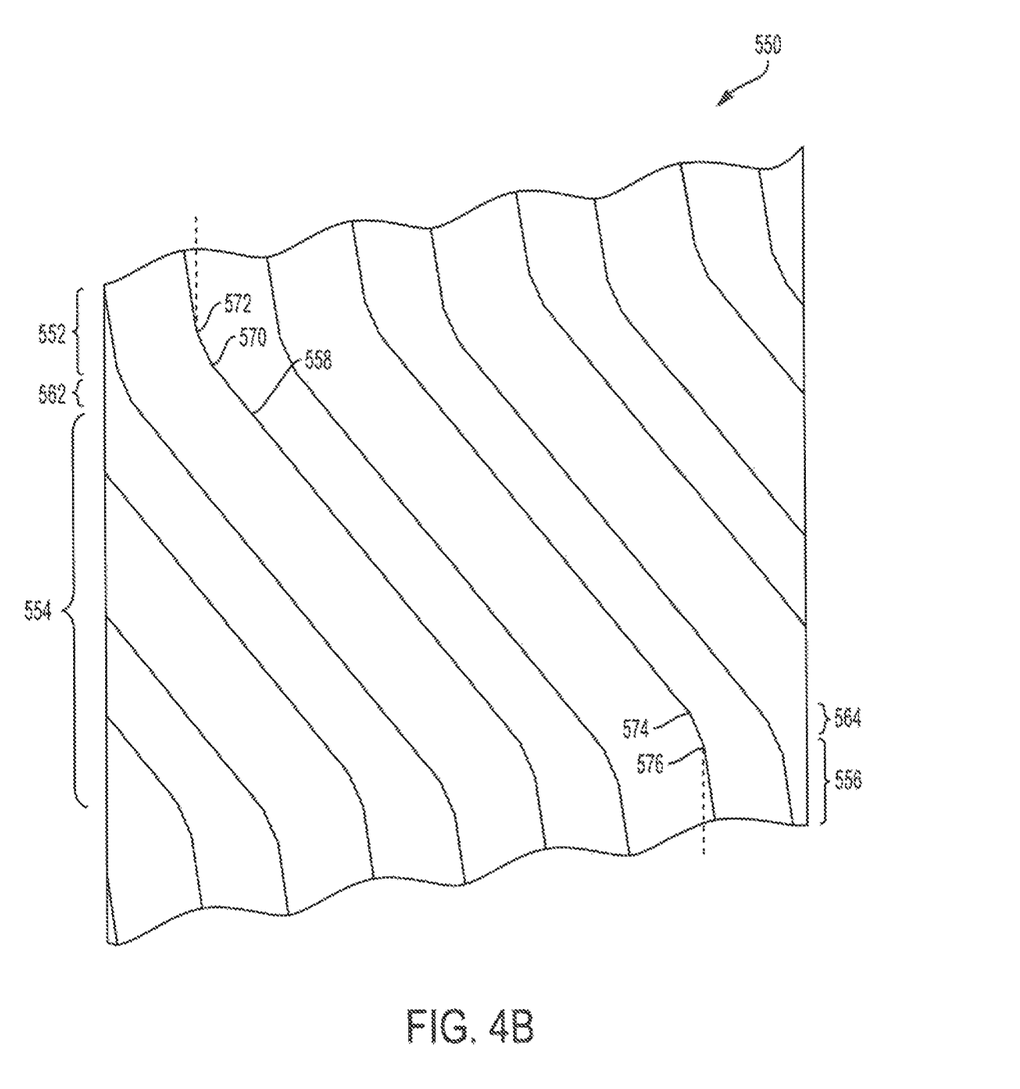
FIG. 4B is a perspective view of a single packing sheet according to a second exemplary embodiment.

FIG. 4B is a perspective view of a single packing sheet 550. The packing sheet 550 includes a top interface region 552, a central region 554, and a lower interface region 556. In a typical embodiment, a height of the top interface region 552 and a height of the lower interface region 556 each account for approximately 5% to approximately 25% of a height of the packing sheet 550; however in other embodiments, other height ratios could be employed. Each of the top interface region 552, the central region 554, and the lower interface region 556 contain a plurality of corrugations 558. For purposes of illustration, FIG. 4B shows a single crimp 558; however, it will be understood that packing sheets according to principles of the present invention will include a plurality of corrugations 558 arranged in a generally parallel orientation with respect to each other. The corrugations 558 extend across the central region 554 at an angle of approximately 45 degrees from vertical; however, in other embodiments the corrugations 558 may be oriented at an angle in the range of approximately 30 degrees to approximately 70 degrees from vertical.

Still referring to FIG. 4B, a first turning region 562, is disposed between the central region 554 and the top interface region 552. A second turning region 564 is disposed between the central region 554 and the lower interface region 556. A first break 570 and a second break 572 turn the corrugations 558 in the first turning region 562 to be oriented at an angle of approximately 5 degrees to approximately 15 degrees from vertical. A third break 574 and a fourth break 576 turn the corrugations 558 in the second turning region 564 to be oriented at an angle of approximately 5 degrees to approximately 15 degrees from vertical. In a typical embodiment, the corrugations 558 are oriented at an angle of approximately 45 degrees and in the range of approximately 30 degrees to approximately 70 degrees from vertical. The corrugations 558 maintain a linear arrangement between the first break 570 and the second break 572. Likewise, the corrugations 558 maintain a linear arrangement between the third break 574 and the fourth break 576. The first break 570 is typically at an angle of 30 degrees to 15 degrees from vertical; however, in other embodiments, other angles could be utilized. Likewise, the second break 572 forms an angle of approximately 15 degrees to 5 degrees from vertical; however, in other embodiments, other angles could be utilized. In a typical embodiment an angle of the first break 570 and an angle of the third break 574 are approximately equal; however, in other embodiments, an angle of the first break 570 and an angle of the third break 574 may be unequal. Likewise, in a typical embodiment an angle of the second break 572 and an angle of the fourth break 576 are approximately equal; however, in other embodiments, an angle of the second break 572 and an angle of the fourth break 576 may be unequal.

Still referring to FIG. 4B, upon entering the top interface region 552 and the lower interface region 556, the corrugations assume a straight, generally parallel orientation arranged at an angle of approximately 5 degrees to approximately 15 degrees from vertical. In a typical embodiment, a lower border 568 of the lower interface region 556, abuts an upper border of an adjacent packing sheet (not explicitly shown).

Figure 5A:
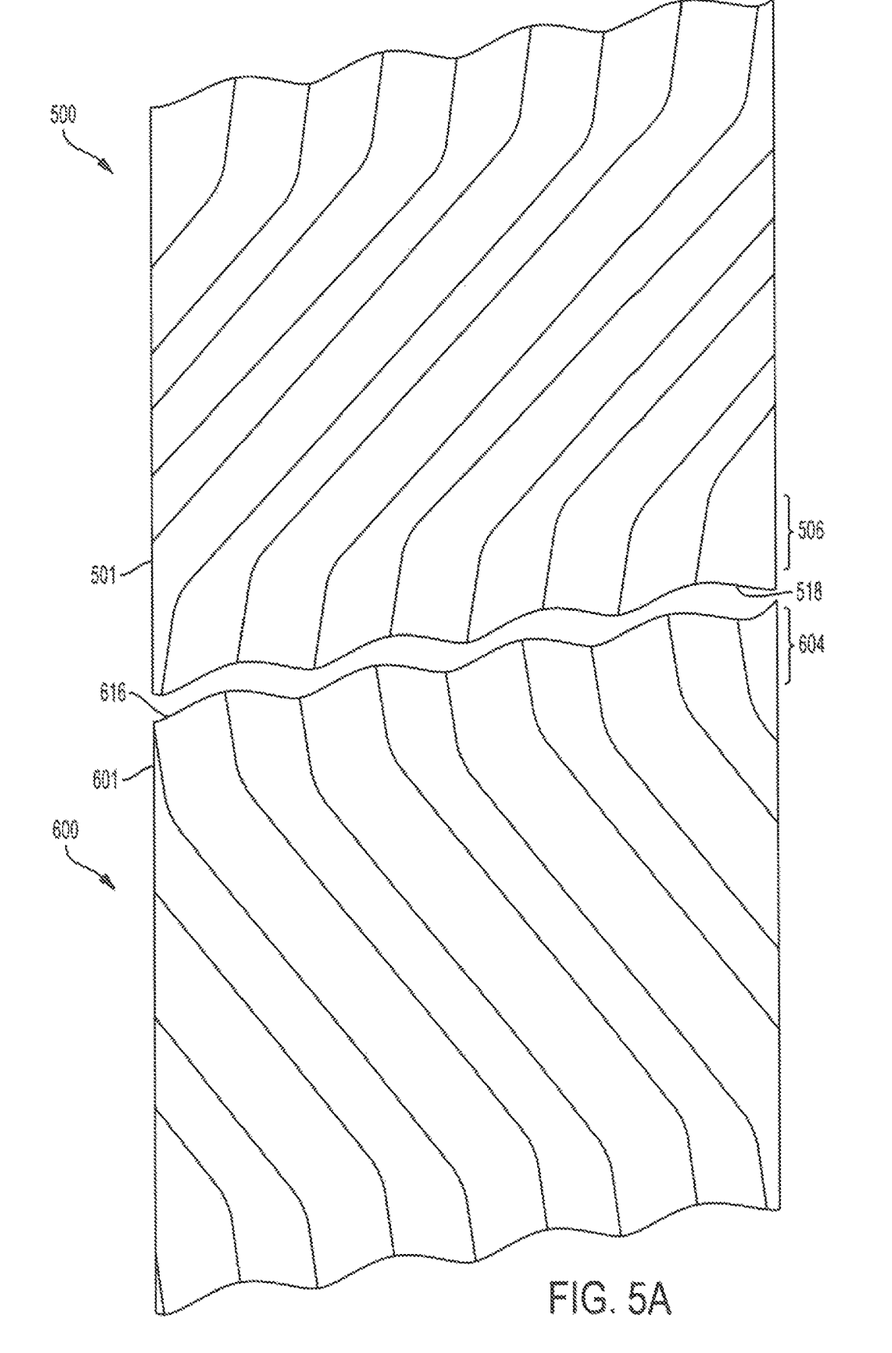
FIG. 5A is a perspective view of an interface between two packing sheets according to an exemplary embodiment.

FIG. 5A is a perspective view of a system of layers of bricks of packing sheets 500 and 600. The packing sheets 501 abuts, and are in fluid communication with, adjacent multiple packing sheets 601. In a typical embodiment, the adjacent packing brick sheets 600 are rotated relative to the packing brick sheets 500 about a longitudinal axis 140 (shown in FIG. 3). A top interface region 604 of the adjacent packing sheets 601 abuts a lower interface region 506 of the packing sheets 501. An interface between the upper border 616 of the adjacent packing units 600 and the lower border 518 of the packing units 500 is smooth and creates a turning zone between the adjacent packing layer 601 and the packing layer 501. The turning zone reduces the pressure drop across the interface between packing unit 500 and the adjacent packing unit 600 thereby improving fluid interaction and increasing efficiency. Further, since the corrugations of the lower interface region 506 of the packing unit 500 and of the top interface region 604 of the adjacent packing unit 600 are disposed at an angle of approximately 5 degrees to approximately 15 degrees from vertical, vapor-liquid flow in the corrugations maintains laminar flow along the corrugation and is not susceptible to such inefficient, random flow pattern as would be present if the corrugations were oriented vertically.

Figure 5B:
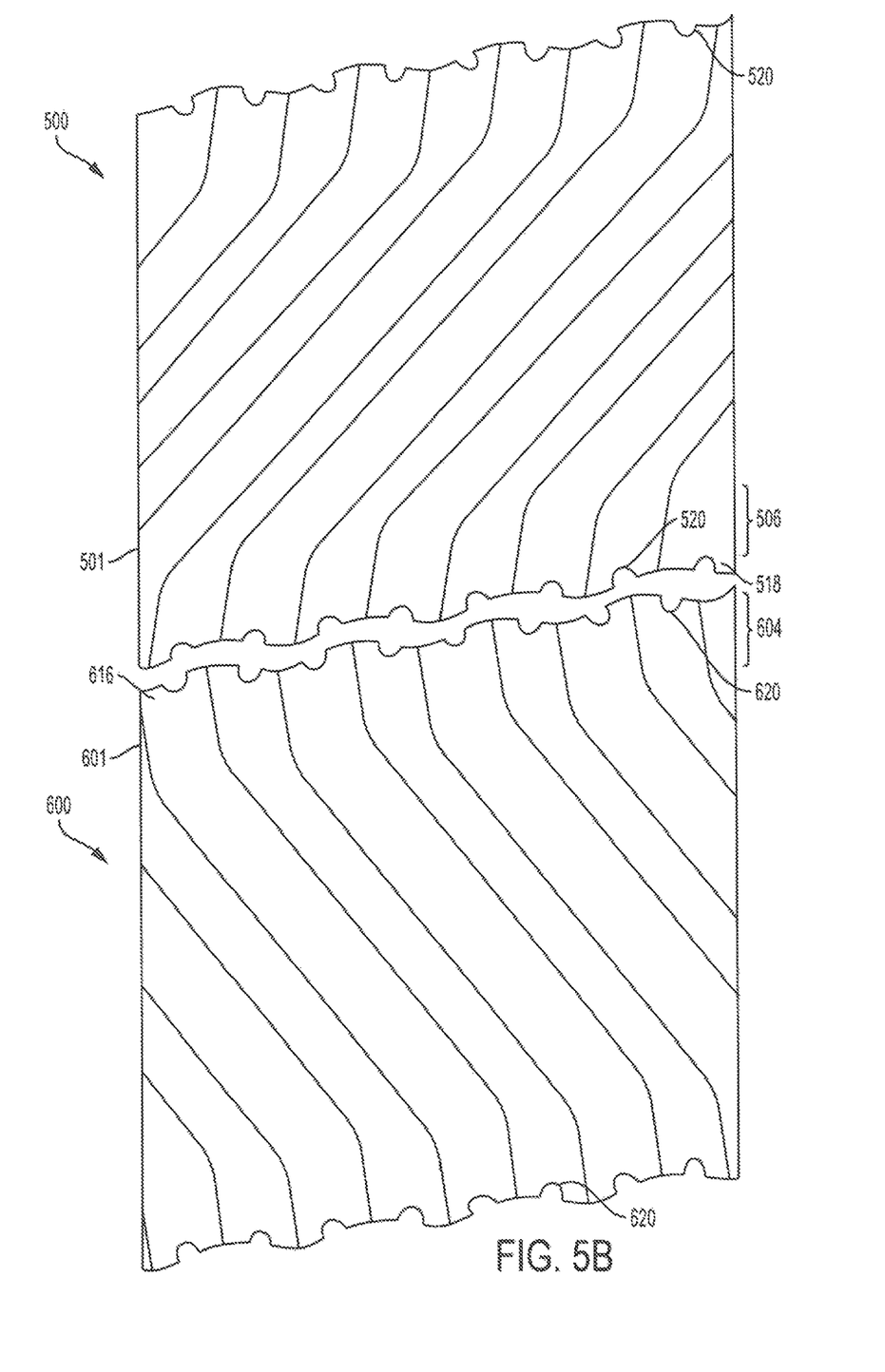
FIG. 5B is a perspective view of an interface between to packing sheets showing edge treatment of the packing sheets according to an exemplary embodiment.

FIG. 5B is a perspective view of an interface between two packing sheets showing edge treatment of the packing sheets. As shown in FIG. 5B, the packing sheet 501 may, in some embodiments, include edge treatments 520. Likewise, the packing sheet 601 may, in some embodiments, include edge treatments 620. The edge treatments are illustrated in FIG. 5B as being generally semi-circular scalloped notches; however, in other embodiments, the edge treatments 520, 620 may be triangular-shaped or rectangular-shaped so as to create a crenellated edge of the packing sheets 500, 600. In a typical embodiment, the edge treatments 520, 620 add additional escape area to the interface between the packing units 500 and the packing units 600. Such additional escape area relieves pressure drop at the interface and improves efficiency.

Although various embodiments of the method and system of the present invention have been illustrated in the accompanying Drawings and described in the foregoing Specification, it will be understood that the invention is not limited to the embodiments disclosed, but is capable of numerous rearrangements, modifications, and substitutions without departing from the spirit and scope of the invention as set forth herein. It is intended that the Specification and examples be considered as illustrative only.

What is claimed is:

1. A process column of the type facilitating enhanced interaction of a first fluid and a second fluid passing in counter-current flow therethrough and being constructed of a vessel having a first fluid inlet and a first fluid outlet disposed in a upper region thereof and a second fluid inlet and a second fluid outlet disposed in a lower region thereof for facilitating the counter-current flow of the first fluid and the second fluid therethrough, the process column comprising:
   a structured packing system having a plurality of packing layers, each packing layer including a plurality of vertically oriented packing sheets, the vertically oriented packing sheets comprising:
      a central region having linear corrugations disposed thereacross;
      a top interface region having a first linear extension of the linear corrugations extending thereacross in a uniformly linear fashion, the linear corrugations in the first linear extension being oriented at an angle in the range of approximately 5 degrees to approximately 15 degrees from vertical;
      a first turning region having uniformly linear corrugations extending thereacross, the first turning region defined by a first break between the linear corrugations of the central region and the uniformly linear corrugations of the first turning region and a second break between the uniformly linear corrugations of the top interface region and the uniformly linear corrugations of the first turning region, the uniformly linear corrugations of the first turning region being oriented at a uniform angle in the range of approximately 30 degrees to approximately 15 degrees from vertical;
      a bottom interface region having a second linear extension of the linear corrugations extending thereacross in a uniform linear fashion, the linear corrugations in the second linear extension being oriented at an angle in the range of approximately 5 degrees to approximately 15 degrees from vertical; and
      a second turning region having uniformly linear corrugations extending thereacross, the second turning region defined by a third break between the linear corrugations of the central region and the uniformly linear corrugations of the second turning region and a fourth break between the uniformly corrugations of the top interface region and the uniformly linear corrugations of the first turning region, the uniformly linear corrugations of the second turning region being oriented at a uniform angle in the range of approximately 30 degrees to approximately 15 degrees from vertical.

2. The process column of claim 1, wherein the linear corrugations are arranged at an angle in the range of approximately 30 degrees to approximately 70 degrees from vertical in the central region.

3. The process column of claim 2, wherein the linear corrugations are arranged at an angle of approximately 45 degrees from vertical in the central region.

4. The process column of claim 1, wherein a height of the top interface region and a height of the bottom interface region account for approximately 5% to approximately 25% of a height of the plurality of packing sheets.

* * * * *